April 18, 1961     L. S. MEYER     2,980,158
METHOD AND MOLD FOR PRODUCING AN ARCHERY BOW
Filed April 10, 1958     3 Sheets-Sheet 1
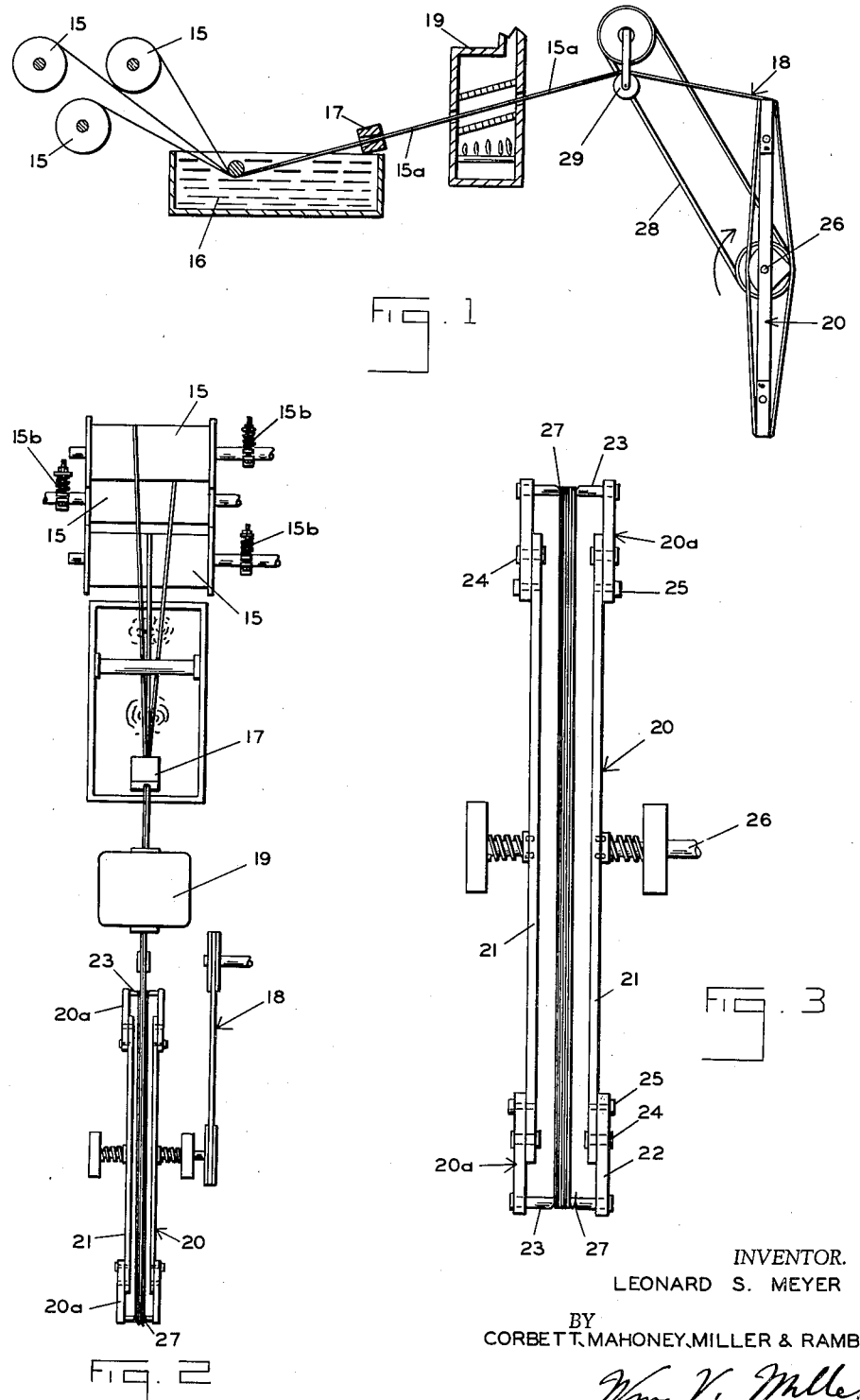
INVENTOR.
LEONARD S. MEYER
BY
CORBETT, MAHONEY, MILLER & RAMBO
BY Wm V. Miller
ATTYS.

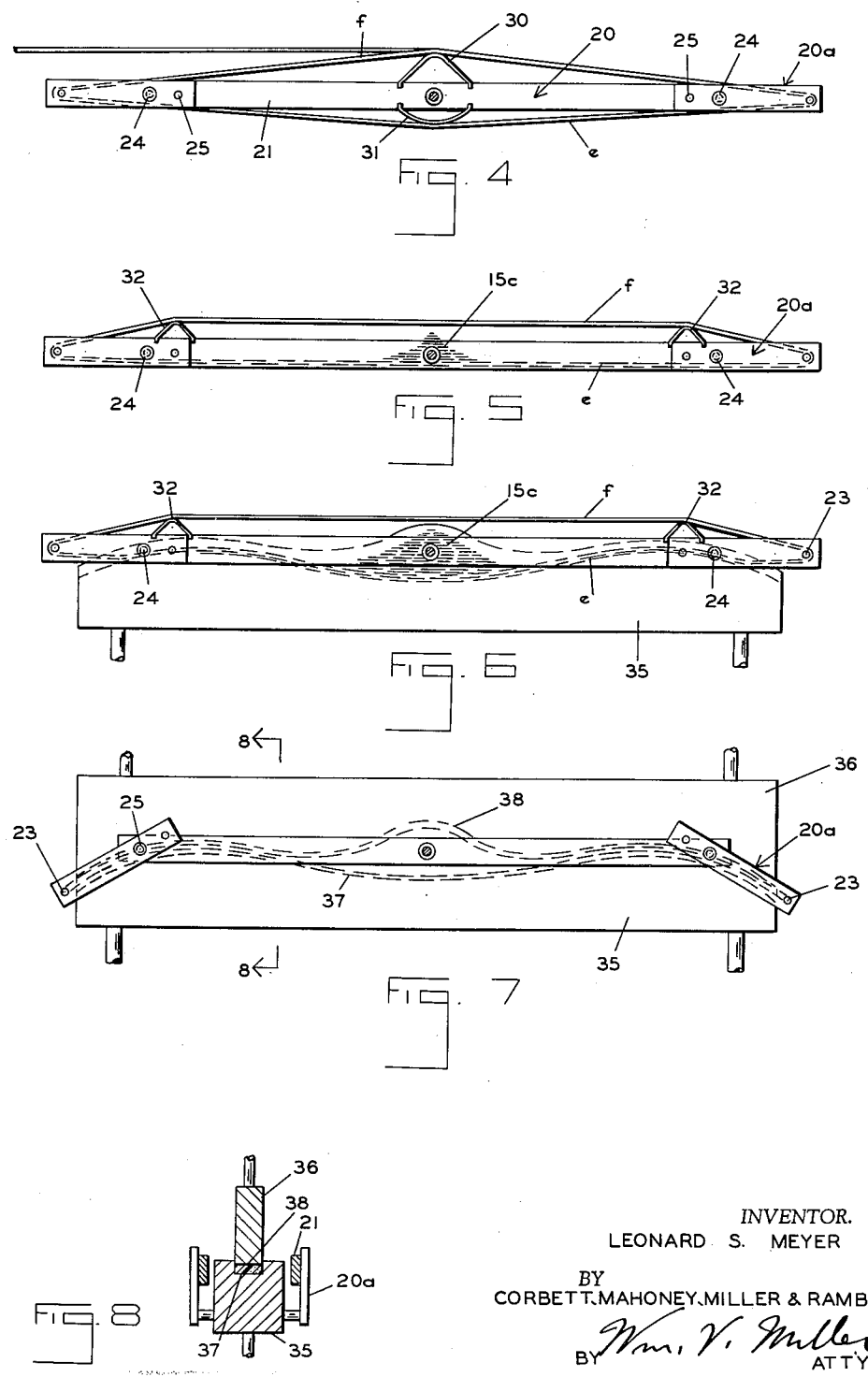

April 18, 1961 L. S. MEYER 2,980,158
METHOD AND MOLD FOR PRODUCING AN ARCHERY BOW
Filed April 10, 1958 3 Sheets-Sheet 3
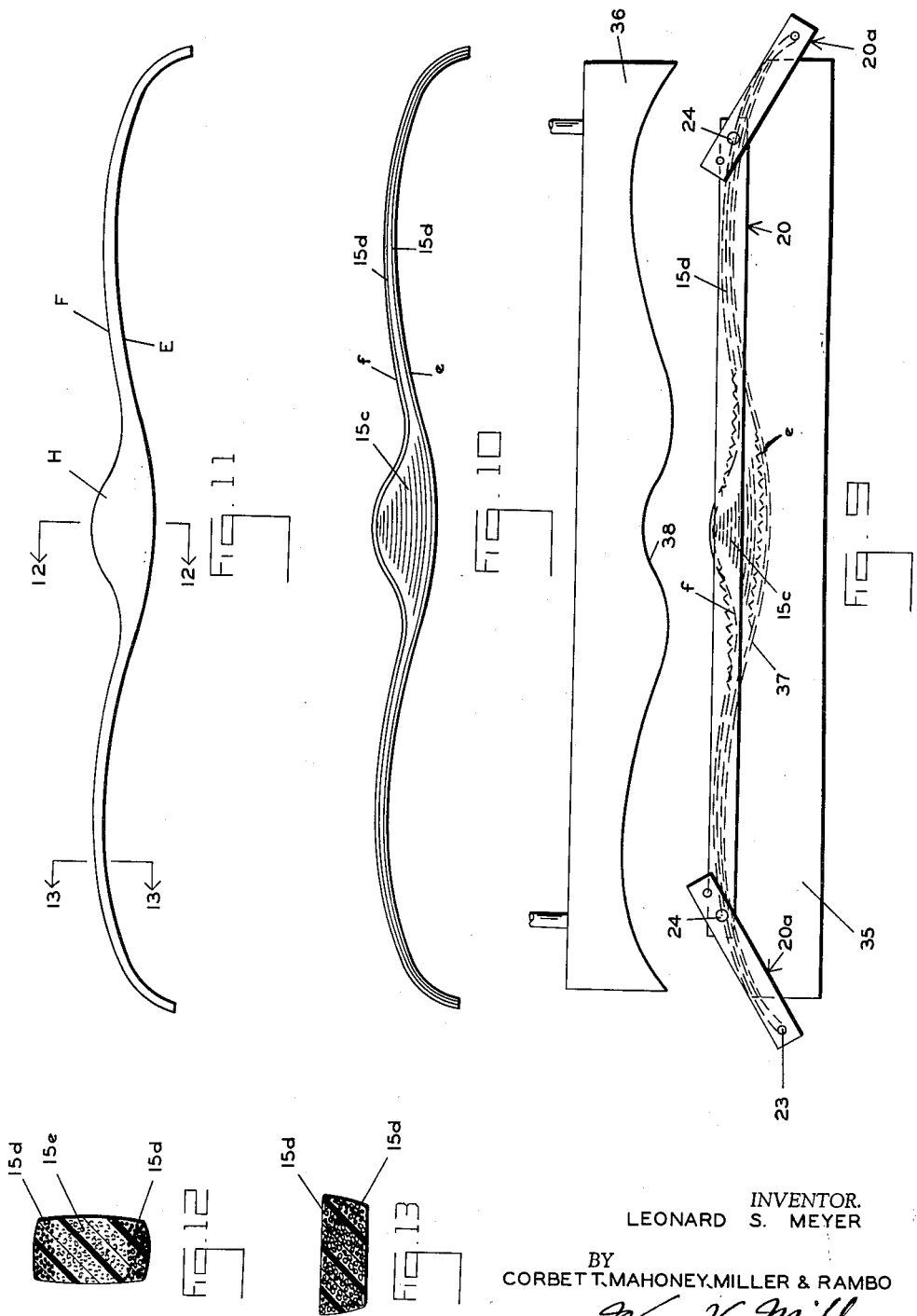
INVENTOR.
LEONARD S. MEYER
BY
CORBETT, MAHONEY, MILLER & RAMBO
BY *Wm. V. Miller*
ATT'YS.

United States Patent Office 2,980,158
Patented Apr. 18, 1961

2,980,158

METHOD AND MOLD FOR PRODUCING AN ARCHERY BOW

Leonard S. Meyer, Waverly, Ohio, assignor, by mesne assignments, to Parallel Products Company, Columbia, S.C., a corporation of South Carolina Filed Apr. 10, 1958. Ser. No. 727,648

5 Claims. (Cl. 154—1)

My invention relates to an archery bow and method and apparatus for producing it. It has to do, more particularly, with an archery bow which is molded as a single piece from fiber-reinforced plastic.

In the patent to Meyer No. 2,689,559, there is disclosed an archery bow which comprises a matrix of a bonding agent or adhesive having fiber reinforcement embedded therein. Specifically, the bow is made of fiber-reinforced plastic, preferably of a thermosetting resin and reinforced with glass fibers or glass yarn. The present invention relates to an archery bow made of similar materials.

According to my invention the bow is molded as a single unit from a suitable bonding or adhesive material and fiber reinforcement so that the fibers will be embedded in a matrix of the bonding agent. As the bonding agent, I use plastics of the type indicated above and, more specifically, thermosetting resins. As the fiber reinforcement I use continuous strands of glass fibers or monofilaments. The strands of reinforcement are arranged in the resin bonding matrix in the form of superimposed parallel layers or laminations that extend longitudinally of the bow in lateral parallel relationship and extend the full length of the bow at least adjacent each of the belly and back surfaces of the bow, being completely embedded in the matrix. In between the belly and back surfaces of the bow, thickening reinforcing resin-bonded glass fibers may be used to obtain a thick mid-section or handle section midway of the bow length. I have found that the properties and action of the finished bow are greatly improved if the parallel continuous strands of fibers at the belly and back of the bow, which extend the full length thereof, are under tension after the resin has set, the strands being embedded in a matrix of the bonding resin so as to maintain the tension and the parallel relationship thereof. This is accomplished by arranging the full-length strands of glass fibers longitudinally of the bow in parallel relationship during molding under tension and maintaining the strands parallel and under tension until the resin sets. Thus, the finished bow will have continuous strands of fibers at the belly and back of the bow extending the full length thereof, disposed in parallel relationship, and embedded in resin so that they will be held under tension. This will give the bow a high Young's modulus at high resin strength. I have obtained, according to this invention, a Young's modulus of over 5,000,000 with no decrease in high compressive strength and fatigue strength. For example, in articles having a Young's modulus of over 5,000,000, I have obtained over 20,000,000 cycles at 25,000 p.s.i. fatigue stress.

For producing a bow of the type indicated above, many problems occur due to the peculiar shape of an article of this type. Archery bows are usually made with a central heavy handle section and with oppositely extending limbs which are sharply curved inwardly at their outer ends. The belly and back surfaces are different in contour from each other, are not parallel with each other, and each usually comprises compound curved surfaces extending longitudinally of the bow. Also, such surfaces are of different linear or longitudinal extent. The glass reinforced thermosetting resin bonding material used in forming the bow must be molded under heat and pressure. Furthermore, as indicated above, during the molding operation, the longitudinally extending continuous strands of fibers which extend the full length of the article must be maintained under tension until the resin sets to form the bonding matrix. Therefore, the steps of forming the bow and the equipment used in such formation must be such that the strands of fibers can be initially placed under tension, and that this tension can be maintained in the mold during the molding operation until the resin sets sufficiently, as a result of heat and pressure, in the course of the molding operation. Due to the complicated contours of the belly and back surfaces to be produced on the bow and the non-parallel relationship of such surfaces as well as to the unequal lengths of such surfaces, there are a number of unusual problems presented which I have solved by this invention. The method and equipment are so designed that the tension on the strands of glass fibers at the bow belly and back-forming surfaces of the mold is maintained during molding even at the curved ends of the mold cavity which form the curved ends of the bow. Also, the equipment is so designed as to permit the insertion of the thickening material, for the mid or handle section, between the belly and back full-length reinforcement strands while still providing for the tension on such full-length strands during the molding operation. The thickening material includes longitudinally extending parallel strands of fibers, arranged in layers of various lengths between the layers of belly and back full-length reinforcement and treated with the bonding resin so that when the bonding resin is cured they will be embedded in a matrix thereof at the center part of the bow but they will be completely covered by the continuous strands at the belly and back of the bow. Thus, the finished bow comprises continuous strands of reinforcement at the complicated belly and back surfaces of the bow, embedded in the resin matrix and being held under tension, which enclose and cover the ends of the longitudinally extending parallel strands of various lengths embedded in the resin between the belly and back surfaces of the bow.

In the accompanying drawings, I have illustrated the steps of my bow-forming method and the equipment used in performing the method as well as the resulting finished archery bow. However, it is to be understood that specific variations may be made without departing from the basic concepts of this invention.

In these drawings:

Figure 1 is a schematic view illustrating equipment used in the steps of impregnating and coating the reinforcing strands with the adhesive and the winding of the strands under tension on a rack or reel.

Figure 2 is a plan view of the equipment of Figure 1.

Figure 3 is a plan view of a special rack or reel used in the process.

Figure 4 is a schematic edge view of the rack or reel with spacers arranged thereon and upon which the reinforcing strands are wound to provide the necessary lengths of reinforcing and tension in the finished bow at the belly and back surfaces thereof.

Figure 5 is a similar view but showing different spacers arranged on the rack or reel to permit insertion of thickening material between the opposed sides of the loops of the strands of reinforcement wound on the rack.

Figure 6 is a view showing the rack of Figure 5 inserted in the lower mold cavity.

Figure 7 is a similar view showing both mold sections in cooperation and the hinged ends of the rack swung downwardly to have the material carried thereby more closely conform to the sharply downwardly curved ends of the mold cavity.

Figure 8 is a transverse sectional view taken along line 8—8 of Figure 7.

Figure 9 is an enlarged schematic view showing the relationship of the fiber reinforcement to the mold before and during the molding operation.

Figure 10 is a diagram showing the final relationship of the reinforcing in the bow molded as in Figure 9.

Figure 11 is a side elevational view of the finished mold.

Figure 12 is a transverse sectional view taken along line 12—12 of Figure 11.

Figure 13 is a transverse sectional view taken along line 13—13 of Figure 10.

According to my invention, the bow is made of thermosetting resin. In actual practice, I have used unsaturated polyester resins which have been cured in the molding operation at temperatures ranging from 225° F. to 250° F., epoxy resins which have been cured in the molding operation at temperatures ranging from 250° F. to 350° F., and diallyl phthalate which have been cured in the molding operation at temperatures ranging from 300° F. to 350° F. The material we have used as the reinforcement has been continuous strands of fibers or monofilaments of glass. All of these reinforced resin materials have been molded under pressures ranging from 50 to 100 p.s.i. Phenolic and melamine resins are equivalent resins and can be substituted for any of the resins mentioned above as the adhesive or bonding agent. These latter resins are similar to diallyl phthalate and can be handled similarly.

In forming the bow according to my invention, several rolls 15 of continuous strands of glass fibers may be supported as shown in Figure 1. These strands may be previously impregnated and coated with uncured resin or they may be passed through a resin bath 16. As pointed out above, in the prior treatment or in the bath we have used unsaturated polyester, epoxy, and diallyl phthalate resins but others such as phenolic and melamine, which are similar to diallyl phthalate are equivalents that can be used. The several continuous strands of glass fibers, after passing through the bath 16 to become impregnated and coated with the resin of the bath, are then passed through an orifice 17 over the bath which will combine the several strands into a group or bundle of the strands indicated at 15a and will remove excess resin.

When I have used polyester and epoxy resins to saturate and coat the bundle of strands 15a, I have fed the bundle 15a directly to suitable winding equipment 18. However, when I have used diallyl phthalate to treat the strands, I have first subjected the bundle 15a to a drying unit indicated at 19. During passage through this unit 19, the bundle of strands 15a is dried sufficiently to permit winding but the resin is not cured. This drying has been accomplished at a temperature of approximately 200° F. When phenolic and melamine resins are used, they will be subjected to a similar drying operation.

The resin-bearing bundle of strands 15a is next passed to the equipment 18 where it is wound on a reel or rack 20 under tension. To provide this tension, each of the rolls 15 is subjected to sufficient friction to resist unwinding of the strands therefrom and provide sufficient friction to create the desired tension on the bundle 15a of the continuous strands. The friction is supplied by an adjustable brake unit 15b associated with the spindle of each of the rolls 15 as indicated in Figure 2.

The reel or rack 20 is of a special type to be useful in forming a bow of the type in question and includes the main longitudinal side members 21 which are disposed in spaced parallel relationship. At each end are the rigid U-sections 20a, each of which includes the side parallel arms 22 joined rigidly together at their outer ends by the transverse support 23. The side arms 22 extend inwardly into overlapping relationship with the adjacent ends of the side members 21 and are pivoted thereto by the transverse pivots 24 which are spaced from the inner ends of the members 21. At the extreme inner ends of the side arms 22, lock pins 25 may be passed through openings therein into aligning openings in the associated side members 21. Thus, the hinged end sections 20a may be locked in the same plane as the side members 21, when the lock pins 25 are in locking position (Figures 1–6), or may be pivoted out of such plane when the lock pins 25 are removed (Figures 7 and 3).

During winding of the bunch of strands 15a on the rack 20, as shown in Figure 1, the lock pins 25 are in locking position so that the rack is flat. The rack is revolved about the axis of the spindle 26 intermediate its ends, the side members 21 thereof being removably and non-rotatably mounted on opposed sections of the spindle 26 as indicated in Figure 3. Before the winding operation is started, the free end of the bundle or bunch of strands 15a may be locked in a guide notch 27 in either one of the transverse members 23 of the rack. The rack 20 may be revolved about the axis of the spindle 26 by suitable driving mechanism, and suitable guide mechanism 29 for the bundle of strands 15a is also provided in association with the winding mechanism. Thus, the bundle of strands 15a will be pulled continuously during the winding operation from the bath 16 and will be under tension which will be cumulative during the winding of the strands in overlapping relationship on the rack 20 in the guide notches 27 of the transverse members 23. The tension will be maintained and when the winding is completed the bundle may be cut, the free end anchored in one of the notches 27 to maintain the tension. There will be sufficient continuous strands of filaments or fibers in the bundle 15a that when it is wound on the rack 20, the bundle will flatten and the strands will spread laterally and wind in overlapping layers in the notches 27 as indicated in Figure 3. The spread will be throughout a width determined by the guide notches substantially equivalent to that of the transverse width of the mold cavity in which the bow is to be molded.

It will be noted from Figure 11 that the concave surface E which will be at the back of the finished bow when strung will be of less length than the convex surface F which will be at the belly of the bow when strung. Also it will be noted that each of these surfaces has a longitudinal contour consisting of compound curves or surfaces and that the belly surface is not parallel to the back surface. In order to approach as nearly as possible the corresponding bow dimensions when winding the bundle of strands 15a on the rack or reel 20, the spacers 30 and 31 are used. The spacers 30 and 31 are removably mounted midway of the length of the rack 20 and project therefrom at opposite sides. The thickness of the spacer 30 is greater than the thickness of the spacer 31. This arrangement, when the bundle of strands of reinforcement 15a is wound on the rack or reel with the spacers 30 and 31 in place as indicated, results in the one side of the loops of the strands being of less longitudinal extent, as indicated at e, as compared to the other side, indicated at f, which is of greater longitudinal extent. The length of the two sides e and f of the loop correspond substantially to the lengths E and F at the corresponding surfaces of the finished bow. This will provide for proper lengths of the reinforcing at the different sides of the bow during molding and for the production of the desired tension by that molding operation in the reinforcing at the back and belly surfaces E and F.

After the winding operation, the rack or reel 20 is removed, the end sections 20a are released and pivoted to relieve the tension on the wound strands and to permit removal of the spacers 30 and 31. The rack is again extended and locked and spacers 32 are slipped under the ends of the loops as indicated in Figure 5 at the side corresponding to that indicated by f in Figure 4. These two spacers 32 need not be of accurate predetermined thickness and are used merely to space the two opposed sides e and f of the loop on the rack or reel to permit the addition of thickening material between these sides.

It will be noted in Figure 11 that in the finished bow there is a thicker handle section H midway of its length. To obtain this thickness, as previously indicated, it is necessary to use thickening layers of resin-treated glass strands. These layers are indicated at 15c and are laid in superimposed layers of gradually decreasing length on the lower side e of the loop as shown in Figure 5. Each layer consists of longitudinally extending strands of the resin-treated reinforcement arranged in laterally parallel relationship and each layer is of a transverse width corresponding to the width of the sides of the loop.

The rack or reel 20 with the loop of continuous reinforcement thereon and the thickening material in place as indicated is then positioned on the lower or female sections 35 of a suitable forming mold with the lower side e of the loop adjacent the bottom 37 of the upwardly opening cavity of the mold which corresponds in contour to the surface E of the finished bow indicated in Figure 8. The rack or reel 20 is sufficiently wide that it will straddle the narrow lower mold section 35 with the side members 21 located at each side thereof as indicated in Figure 8. The rack 20 is now unlocked, the spacers 32 are removed, and the ends 20a of the rack are swung downwardly, the transverse members 23 being spaced outwardly beyond the ends of the mold so as not to interfere with the downward swinging. Then the upper punch or male section 36 of the mold is moved downwardly under sufficient pressure into cooperation with the lower mold section 35. The upper mold section 36 will have a lower surface or wall 38 which corresponds in contour to the surface of the bow indicated by F in Figure 11. The upper mold wall 38 is of greater total length than the lower mold wall 37, corresponding to the lengths of the bow surfaces F and E, respectively.

The mold sections are heated by steam lines as indicated or in any other suitable manner. The article is molded by the cooperating mold sections 35 and 36 and is molded and cured under pressure. For example, if a polyester resin is used, it will be cured at a temperature of 230° F. under a pressure of 50 to 100 p.s.i.

The molding operation is indicated more clearly in Figure 9. In this figure, the rack 20 is shown in the position indicated in Figure 7 on the lower section 35 of the mold with its ends 20 swung downwardly. There will be slack in the upper and lower sides f and e, respectively, of the reinforcing loop because of the use of the spacers 30 and 31, during the winding operation. Some of the slack in the upper side f will be taken up by the downward swinging of the rack ends 20a and this downward swinging will cause both sides of the loop to more closely follow the downturned ends of the mold cavity. The wavy lines in Figure 9 indicate slack in the loop sides e and f and their relative initial positions in the mold cavity. At the ends both sides of the loop follow fairly closely the downturned ends of the mold cavity and they loosely bridge the center part of the mold cavity with the thickening layers 15c therebetween. However, when the mold sections are pressed together, since they are related in length to the corresponding molding surfaces and are held at their ends by the transverse rack members 23, the sides e and f are stretched and placed under tension as they are molded into conformity with the adjacent surfaces 37 and 38 of the mold. The final positions of the sides e and f of the reinforcing loop are illustrated by the broken lines in Figure 9.

After the molding and curing operation the ends of the material projecting from the mold to the transverse reel members 23 are severed to separate the molded bow from the reel 20. The mold sections 35 and 36 are then separated and the bow is removed. It will then have the necessary string slits formed in the extremities of the limbs and when the string is applied will be bent in a curvature reverse to that of Figure 10.

The arrangement of the strands of yarn formed of the glass fibers is indicated in Figures 10 to 13. The strands 15d at the belly and back of the bow will extend the full length thereof, only two of these strands being shown at each surface for clarity but it will be understood that there will be more. The strands 15c of the thickening layers will extend different lengths and will be disposed between the opposed layers of strands 15d at the belly and back of the bow. However, the ends of the short strands 15c will be enclosed within the full-length strands 15d and no ends of the strands 15c will extend to the surface of the bow. In Figures 12 and 13, the full-length strands 15d are indicated by dark circles and the shorter strands 15c are indicated by light circles.

Thus, I have provided a bow which has belly and back surfaces of complicated or compound curves, the surfaces being non-parallel with each other, and being of different total length. In spite of these unusual characteristics, I have been able to produce a bow which has the full-length reinforcing embedded at each surface which is under tension. Although I have specified an archery bow in this disclosure, it is to be understood that certain features of my invention are applicable to other articles which have opposed irregular non-parallel surfaces of unequal lengths.

The material of the bow has a Young's modulus in excess of 5,000,000 but the upper limit is kept below 3 percent of the linear elongation. This modulus is obtained at a high resin strength without sacrificing the desirable properties such as compressive strength, fatigue strength, and other general properties.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described my invention, what I claim is:

1. The method of molding an archery bow, having opposed elongated belly and back surfaces which are of unequal lengths and are in non-parallel relationship, of an adhesive matrix and fiber reinforcing strands embedded therein, which comprises winding adhesive-treated strands of the fiber reinforcing under tension on a reel in the form of a loop so that the opposed sides of the loop are of unequal lengths in accordance with the unequal lengths of said belly and back surfaces, placing the reel so that the loop thereon is between opposed sections of a mold, which have opposed contours of unequal lengths corresponding to said belly and back surfaces of the bow which are to be imparted to the said belly and back surfaces of the bow, with the tension released from the loop but with the ends of the loop being held by the reel, and moving the mold sections together into cooperative relationship so that the sides of the loop will be moved toward each other while the overall length of the loop is maintained so as to provide tension in the strands at the opposite sides of the loop and so as to form said unequal length belly and back surfaces.

2. A method according to claim 1 in which the reel has pivoted sections at its end and the mold cavity is sharply curved at its ends and the pivoted sections of the reel are adjusted so that the ends of the loop more closely follow the contour of the mold cavity.

3. A method according to claim 1 in which the adhesive is a thermosetting resin and the reinforcing strands are of glass yarn.

4. The method of molding an archery bow, having opposed elongated belly and back surfaces which are of unequal lengths and are in non-parallel relationship and a thicker mid-section, of an adhesive matrix and fiber reinforcing strands embedded therein, which comprises winding adhesive-treated strands of the fiber reinforcing under tension on a reel in the form of a loop so that the opposed sides of the loop are of unequal lengths in accordance with the unequal lengths of said belly and back surfaces, placing thickening material in the form of adhesive treated strands of the reinforcing in layers of unequal lengths within the sides of the loop and extending longitudinally thereof, placing the reel so that the loop thereon is between opposed sections of a mold, which have opposed contours of unequal lengths corresponding to said belly and back surfaces of the bow which are to be imparted to the said belly and back surfaces of the bow, with the tension released from the loop but with the ends of the loop being held by the reel, and moving the mold sections together into cooperative relationship so that the sides of the loop will be moved toward each other while the overall length of the loop is maintained so as to provide tension in the strands at the opposite sides of the loop and so as to form said unequal length belly and back surfaces and with the thicker mid-section.

5. In combinaiton, a mold for moldwing an archery bow having ends which curve sharply in the same direction, said mold having a cavity which has sharply curved ends for producing said ends on the bow, a reel for supporting a loop of material wound thereon and having transverse end members disposed outside the ends of the mold cavity and side members disposed outside the mold cavity and joining said transverse members, said reel including a hinged section at each end thereof connecting said side members and each of said transverse end members so that the reel can be angled at its ends to more closely follow the curved ends of said mold cavity.

References Cited in the file of this patent

UNITED STATES PATENTS

| | | |
|---|---|---|
| 2,090,369 | Liebowitz | Aug. 17, 1937 |
| 2,238,216 | Eger | Apr. 15, 1941 |
| 2,454,074 | Marc | Nov. 16, 1948 |
| 2,524,737 | Sawyer | Oct. 3, 1950 |
| 2,600,775 | Hurry et al. | June 17, 1952 |
| 2,689,559 | Meyer | Sept. 21, 1954 |
| 2,694,661 | Meyer | Nov. 16, 1954 |
| 2,768,921 | Pigg | Oct. 30, 1956 |
| 2,815,015 | De Giacomo | Dec. 3, 1957 |

UNITED STATES PATENT OFFICE
CERTIFICATE OF CORRECTION

Patent No. 2,980,158   April 18, 1961

Leonard S. Meyer

It is hereby certified that error appears in the above numbered patent requiring correction and that the said Letters Patent should read as corrected below.

Column 7, line 1, for "matriz" read --- matrix ---; line 5, for "tho" read --- the ---; line 23, for "combinaiton" read --- combination ---; same line 23, for "moldwing" read --- molding ---.

Signed and sealed this 5th day of September 1961.

(SEAL)
Attest:

ERNEST W. SWIDER
Attesting Officer

DAVID L. LADD
Commissioner of Patents